(12) United States Patent
Metivier

(10) Patent No.: US 9,106,271 B2
(45) Date of Patent: *Aug. 11, 2015

(54) SYSTEM FOR PROGRAMMING A LOCK COMPRISING CONTACTLESS NFC COMMUNICATION MEANS

(71) Applicant: Assa Abloy AB, Stockholm (SE)

(72) Inventor: Pascal Metivier, Feucherolles (FR)

(73) Assignee: ASSA ABLOY AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,819

(22) Filed: May 9, 2014

(65) Prior Publication Data

US 2014/0248867 A1 Sep. 4, 2014

Related U.S. Application Data

(63) Continuation of application No. 13/266,958, filed as application No. PCT/FR2010/050807 on Apr. 28, 2010, now Pat. No. 8,731,466.

(51) Int. Cl.
| | |
|---|---|
| *H04B 5/00* | (2006.01) |
| *H04M 1/66* | (2006.01) |
| *H04M 1/68* | (2006.01) |
| *H04M 3/16* | (2006.01) |
| *H04L 29/06* | (2006.01) |

(52) U.S. Cl.
CPC ............ *H04B 5/0025* (2013.01); *H04L 63/061* (2013.01); *H04L 63/0492* (2013.01)

(58) Field of Classification Search
CPC .......................... H04L 63/0492; H04L 63/061
USPC ........................ 455/41.1, 41.2, 410, 411, 26.1
See application file for complete search history.

(56) References Cited

U.S. PATENT DOCUMENTS 8,731,466 B2 * 5/2014 Metivier ...................... 455/41.1

FOREIGN PATENT DOCUMENTS

GB 2449510 A * 11/2008

OTHER PUBLICATIONS

French Search Report for FR Application No. 0952856, dated Nov. 25, 2009.
International Search Report for PCT/FR2010/050807, mailed Aug. 13, 2010.
Written Opinion (English translation) for International (PCT) Patent Application No. PCT/FR2010/050807 mailed Aug. 13, 2010, 6 pages.

(Continued)

*Primary Examiner* — Eugene Yun
(74) *Attorney, Agent, or Firm* — Sheridan Ross P.C.

(57) ABSTRACT

The invention relates to a system including a lock (10) provided with electronic NFC transceiver circuits and electric circuits for controlling mechanical locking/unlocking members, and a portable telephone (16) provided with circuits for NFC mode of operation. The telephone comprises means for initializing the lock, said means including means for: downloading, from a remote site (20), an applet and elements required for initializing the lock; verifying, using the telephone, the identifier and the transport key stored in the lock against the downloaded ones; deactivating the transport key of the lock; loading, onto the lock, a unique random algorithm and a cryptographic key that have been downloaded; and generating a message notifying of the termination of the initialization of the lock.

20 Claims, 1 Drawing Sheet

(56) References Cited

OTHER PUBLICATIONS

International Preliminary Report on Patentability (English translation) for International (PCT) Patent Application No. PCT/FR2010/050807 mailed Nov. 29, 2011, 7 pages.

Official Action for U.S. Appl. No. 13/266,958, mailed Aug. 19, 2013 5 pages.

Notice of Allowance for U.S. Appl. No. 13/266,958, mailed Jan. 8, 2014 10 pages.

\* cited by examiner

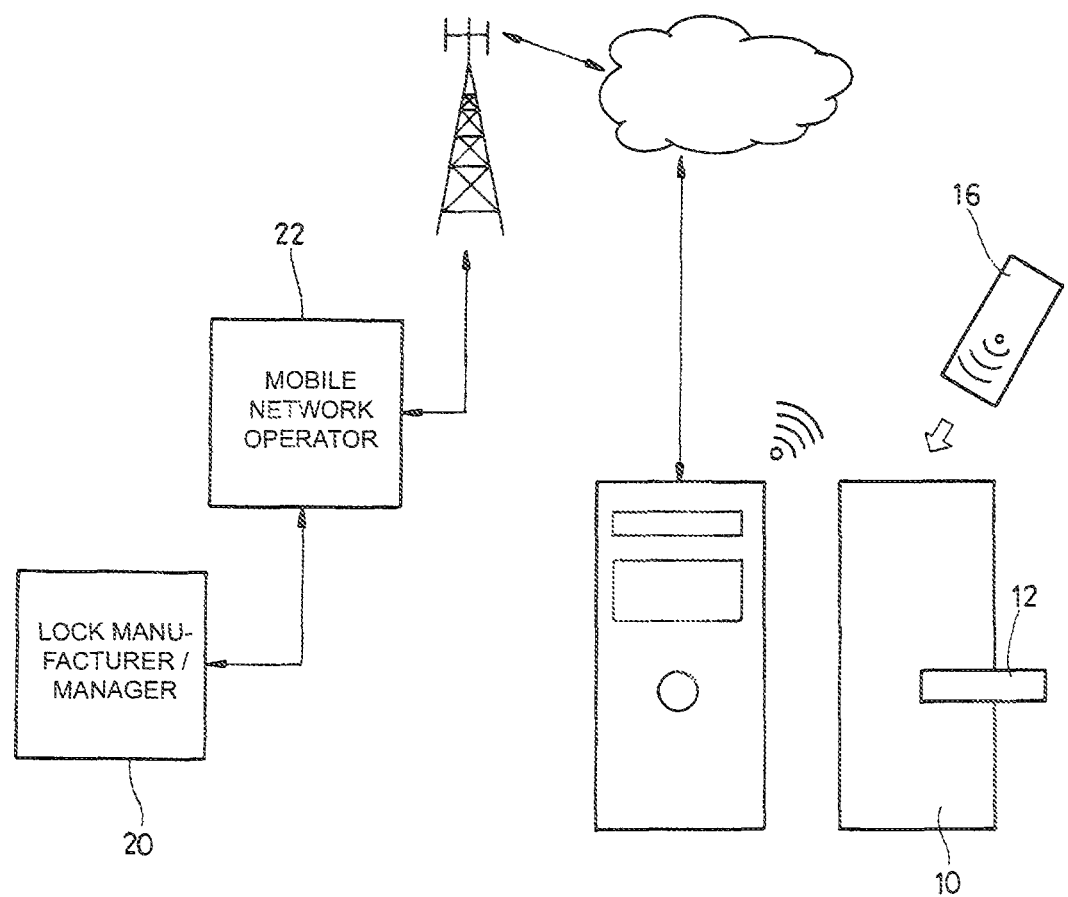

SYSTEM FOR PROGRAMMING A LOCK COMPRISING CONTACTLESS NFC COMMUNICATION MEANS

CROSS-REFERENCE TO RELATED APPLICATION

This application is a continuation of U.S. patent application Ser. No. 13/266,958, filed Jan. 9, 2012, now issued as U.S. Pat. No. 8,731,466, which is a 371 of International Patent Application No. PCT/FR2010/050807, filed Apr. 28, 2010, the entire contents of which are hereby incorporated herein by reference.

The invention relates to locks controlled by means of a hand-held object acting as a key, typically in the form of a contactless badge or chip card, which cooperates with the lock by way of a non-galvanic mutual coupling of the NFC (Near Field Communication) type.

With such technology, the coupling between the hand-held object and the lock is made by varying a magnetic field produced by a coil (such technique being referred to as "induction process"). The lock comprises for that purpose an inductive circuit excited by an AC signal that produces a variable magnetic field, able to be detected over a range of at most a few centimeters. The hand-held object located within this range receives the energy of the field (which permits in particular the remote power supply of the hand-held object, the latter having generally no power source of its own) and modulates an inner charge. Such modulation, coded by various data coming from the hand-held object (identifier, encryption key, etc.), is then detected by the lock, which establishes the desired bidirectional communication.

Various coding and encryption techniques exist for securing the contactless communication between the hand-held object and the lock, and protecting the latter against any risk of fraud.

Such protection techniques use algorithms and keys that are implemented in the lock. However, to thwart any risk of fraud, in particular during the transport from the factory to the definitive location, the lock is not originally provided with all the security elements permitting the implementation of these techniques.

Initially, the locks are delivered with provisional cards referred to as "emergency cards", which permit to operate the lock during the time required for the installation thereof, but which do not operate the most elaborate protection techniques; the cryptographic techniques used at this stage are used with a provisory (logical) key referred to as a "transport key", also of temporary nature, or even with a limited service time.

Once the lock is installed, it has to be "programmed" so as to implement therein the algorithms, advanced cryptographic elements and definitive keys permitting to obtain the desired high level of security.

In practice, such programming is often difficult to perform, with risk of errors, even for the lock professionals and even more so for individual users that would desire to install and program their lock themselves. Such complexity and risk of errors are an obstacle to a wide diffusion of these NFC-type contactless locks, despite the numerous advantages they offer, in particular as regards the security.

The object of the invention is to propose a new technique for programming a NFC-type contactless lock, which is easy to implement, even by an uninitiated user, and which moreover does not require any specific material; while keeping a very high level of security all along the sequence of operations, from the transport from the manufacturing factory up to the final programming.

The principle of the invention consists in using for this programming step a portable telephone equipped with a NFC chip and a NFC antenna, with the telephone SIM card being used as an element for securing the data exchanges performed by NFC.

The exchanges between the telephone and the lock may be secured by means of a specific application of the "applet" type, previously downloaded by the telephone. Once loaded and activated, this applet will automatically implement the different steps required for programming the lock, such as downloading an encryption algorithm, keys, identifiers, . . . operable to ensure the lock programming in a perfectly secured manner.

An exemplary embodiment of the invention is described with reference to FIG. 1. In this figure, the reference number 10 designates the lock, which externally looks like a unitary element from which appears only a handle 12 and a target area 14 for the NFC communication, i.e. an area against which the hand-held object that acts as a key for opening the lock will have to be presented, wherein the object is a contactless card 16 provided with suitable circuits.

When the card 16 is approached, the lock produces an AC magnetic field in order to establish a bidirectional coupling for data exchange with the card 16. The lock may then interrogate this card, according to known techniques, to read therein identifiers, codes, data, authorizations, etc., stored in the memory of the card. These data are verified and, if they match, they control a motor for unlocking the mechanical elements of the lock.

To avoid any fraud attempt, such security techniques cannot be implemented in the lock in the state the latter is at the factory output, during the transport to the final site, and as long as the lock is not definitively installed.

It is only after the lock is installed that the complete security functions will be activated, by a so-called "programming" operation. Meanwhile, the lock can only be operated by means of a card referred to as an "emergency card", which uses only simplified algorithms based on a provisional "transport key".

The way this programming is characteristically performed according to the invention will now be described.

The programming is performed by means of a portable telephone 18 provided, in addition to the telephony circuits for data transmission and reception, with a NFC chip and an induction coil acting as an antenna. Those circuits enable the telephone to operate in an NFC mode, with the SIM card being used as a security element for the NFC communication.

The lock is identified by a non-modifiable unique identifier (hereinafter "the identifier") that permits to recognize it between all the locks, such identifier being of similar nature as the international Mobile Equipment Identity, IMEI, identifier embedded in a GMS or UMTS mobile terminal for the unique and definitive identification of the equipment.

The first operation consists in downloading into the telephone an applet that will permit to automatically execute the sequence of steps required for programming the lock.

Such downloading follows a request sent by the telephone 18 to the remote site 20 of the lock manufacturer or manager, via the operator 22 of the mobile telephone network.

Once downloaded by the telephone 18, the applet is activated, which triggers the transmission from the remote site 20 to the telephone 18 of the different elements required for the programming of each lock, in particular: the recorded lock identifier (or the list of lock identifiers if there are several locks to be programmed), a unique random algorithm, a transport key, a cryptographic key, etc.

Once all these data are loaded into the telephone 18, the user just needs to present the telephone in front of the target area 14 of the lock to be programmed (or of each of the locks to be programmed) in order to establish the bidirectional NFC coupling between the telephone and the lock.

The telephone reads the identifier of the lock to which it is thus coupled: if the identifier read in the lock matches with the identifier received by the telephone from the remote site (or with one of the identifiers, in case there is a plurality of locks to be programmed), then the telephone determines the transport key associated with this identifier.

If the transport key of the lock corresponds to that determined by the telephone, the latter can then begin the actual lock programming process.

First, the telephone resets the lock, by deactivating the transport key and by making the emergency cards delivered with the lock inoperative.

Then, it uploads into the lock the elements required for implementing the security procedures, in particular the unique random algorithm and the definitive cryptographic key. The secured cryptographic procedure can then be activated.

During the execution of the programming process, the user can follow the operation progress by means of a progress bar displayed on the telephone screen.

Once all the operations are correctly executed, the applet generates a message for notifying the completion of the lock programming and displays this message on the telephone screen, indicating that the operation has been successfully performed.

If several locks have to be programmed, the list of the remaining locks to be programmed is displayed on the telephone screen.

The invention claimed is:

1. An access control system comprising:
    a lock comprising electronic circuits that enable the lock to engage in contactless communications, the lock further comprising electric circuits that enable the lock to control one or more mechanical elements;
    a portable communication device comprising circuits that enable the portable communication device to engage in the contactless communications with the lock; and
    a lock-programming application that enables the portable communication device to program the lock via the contactless communications with programming elements that include, wherein the lock-programming application is configured to:
        receive a lock identifier and a transport key used to secure the lock during transport thereof;
        confirm validity of the received lock identifier by comparing the lock identifier with an authorized lock identifier;
        confirm validity of the received transport key by comparing the received transport key with an authorized transport key; and
        upload the programming elements to the lock thereby deactivating and replacing the transport key.

2. The access control system of claim 1, wherein the lock-programming application corresponds to an applet that is downloaded to the portable communication device, thereby enabling the portable communication device to program the lock via the contactless communications.

3. The access control system of claim 1, wherein the contactless communications correspond to a non-galvanic mutual coupling.

4. The access control system of claim 3, wherein the non-galvanic mutual coupling corresponds to a coupling of a Near-Field Communication (NFC) type.

5. The access control system of claim 1, wherein the programming elements further include a unique random algorithm and a cryptographic key.

6. The access control system of claim 5, wherein the programming elements are uploaded to the lock from the portable communication device via a Near-Field Communication (NFC) inductive coupling.

7. The access control system of claim 1, wherein the received lock identifier is compared with a plurality of authorized lock identifiers, each of which correspond to locks authorized to be programmed.

8. The access control system of claim 1, wherein the transport key is deactivated by resetting the lock.

9. The access control system of claim 1, wherein the programming elements are stored in a secure element of the portable communication device.

10. The access control system of claim 1, wherein the portable communication device comprises a Near-Field Communication (NFC)-enabled phone.

11. A non-transitory computer-readable medium comprising processor-executable instructions that, when executed by a processor, program a lock, the instructions including:
    instructions configured to receive a lock identifier and a transport key used to secure the lock during transport thereof;
    instructions configured to confirm validity of the received lock identifier by comparing the received lock identifier with an authorized lock identifier;
    instructions configured to confirm validity of the received transport key by comparing the received transport key with an authorized transport key; and
    instructions configured to cause elements required for programming the lock to be uploaded to the lock thereby deactivating and replacing the transport key.

12. The computer-readable medium of claim 11, wherein the elements required for programming the lock comprise a unique random algorithm and a cryptographic key.

13. The computer-readable medium of claim 11, wherein the transport key and lock identifier are received via a Near-Field Communication (NFC) coupling established between the lock and a portable communication device.

14. The computer-readable medium of claim 11, wherein the transport key is deactivated by resetting the lock.

15. The computer-readable medium of claim 14, wherein resetting the lock further comprises rendering emergency cards delivered with the lock inoperative for opening the lock.

16. A portable communication device, comprising:
    a processor;
    circuits that enable contactless communications; and
    an applet stored in computer memory that is executable by the processor, the applet including:
        instructions configured to receive a lock identifier and a transport key used to secure the lock during transport thereof;
        instructions configured to confirm validity of the received lock identifier by comparing the received lock identifier with an authorized lock identifier;
        instructions configured to confirm validity of the received transport key by comparing the received transport key with an authorized transport key; and
        instructions configured to cause elements required for programming the lock to be uploaded to the lock via the circuits thereby deactivating and replacing the transport key.

17. The portable communication device of claim 16, wherein the circuits comprise a resonant circuit that creates a non-galvanic coupling with a corresponding resonant circuit of the lock.

18. The portable communication device of claim 17, wherein the elements required for programming the lock comprise a unique algorithm and a cryptographic key.

19. The portable communication device of claim 18, wherein the elements required for programming the lock are uploaded to the lock via the non-galvanic coupling.

20. The portable communication device of claim 16, wherein the received lock identifier is compared with a plurality of authorized lock identifiers, each of which correspond to locks authorized to be programmed with the applet.

* * * * *